United States Patent
Kim et al.

(10) Patent No.: US 8,531,529 B2
(45) Date of Patent: Sep. 10, 2013

(54) DEAD PIXEL COMPENSATION TESTING APPARATUS

(75) Inventors: Geon Pyo Kim, Guri Gyeonggi-do (KR); Jong Park Kim, Gunpo Gyeonggi-do (KR); Myoung Kwan Kim, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 88 days.

(21) Appl. No.: 13/273,321

(22) Filed: Oct. 14, 2011

(65) Prior Publication Data

US 2012/0105648 A1  May 3, 2012

(30) Foreign Application Priority Data

Oct. 29, 2010  (KR) .................. 10-2010-0106634

(51) Int. Cl.
*H04N 9/64* (2006.01)
*H04N 17/00* (2006.01)

(52) U.S. Cl.
USPC .............................. 348/188; 348/187; 348/246

(58) Field of Classification Search
USPC ......... 348/187, 188, 246, 247, 616; 382/260, 382/261, 275
See application file for complete search history.

(56) References Cited

U.S. PATENT DOCUMENTS

| | | | | |
|---|---|---|---|---|
| 7,362,355 | B1* | 4/2008 | Yang et al. | 348/222.1 |
| 7,593,569 | B2* | 9/2009 | Sakurai | 382/167 |
| 2001/0000315 | A1* | 4/2001 | Uchida | 382/305 |
| 2002/0105579 | A1* | 8/2002 | Levine et al. | 348/187 |
| 2004/0263497 | A1* | 12/2004 | Leroux et al. | 345/204 |
| 2007/0291142 | A1* | 12/2007 | Noh et al. | 348/246 |
| 2008/0079826 | A1* | 4/2008 | Noh | 348/246 |
| 2011/0050933 | A1* | 3/2011 | Omi | 348/220.1 |

FOREIGN PATENT DOCUMENTS

| | | |
|---|---|---|
| KR | 1020050081939 A | 8/2005 |
| KR | 1020080038991 A | 5/2008 |
| KR | 1020090056041 A | 6/2009 |

* cited by examiner

*Primary Examiner* — Victor Kostak
(74) *Attorney, Agent, or Firm* — William Park & Associates Patent Ltd.

(57) ABSTRACT

A dead pixel compensating apparatus includes, inter alia, a pattern generation unit generating a programmable test pattern including data with respect to at least one dead pixel; a register array storing the test pattern; a dead pixel compensation unit receiving the test pattern stored in the register array and performing a dead pixel compensation algorithm to output compensation data; and a determination unit comparing the test pattern and the compensation data to determine whether or not the dead pixel compensation algorithm has an error, wherein a dead pixel compensation algorithm for compensating for a dead pixel of an image sensor in image data supplied from the image sensor is tested.

18 Claims, 3 Drawing Sheets

DEAD PIXEL COMPENSATION TESTING APPARATUS

CROSS-REFERENCE TO RELATED APPLICATIONS

This application claims the priority of Korean Patent Application No. 10-2010-0106634 filed on Oct. 29, 2010, in the Korean Intellectual Property Office, the disclosure of which is incorporated herein by reference.

BACKGROUND OF THE INVENTION

1. Field of the Invention

The present invention relates generally to a dead pixel compensation testing apparatus and, more particularly to a dead pixel compensation testing apparatus capable of effectively testing a dead pixel compensation algorithm.

2. Description of the Related Art

A digital camera includes an image sensor that processes the digital signal obtained from a light signal of an object. The two types of image sensors that are widely in use are a charged coupled device (CCD) including a plurality of unit pixels and a complementary metal oxide semiconductor (CMOS).

The CCD and the CMOS capture an image by utilizing a photoelectric conversion unit such as a photodiode to accumulate the electrical charges of the incident light from an object as pixels. The accumulated electrical charges are then converted into digital signals of the pixels. Some pixels may become defective during the fabrication process of the image sensors due to foreign particle contamination or due to various unstable factors that may be present during the fabrication process. The defective pixels, when introduced as described above, may be the source of the fixed pattern noise.

The various types of defective pixels that may result during the fabrication process of image sensors are detected and compensated by the image processing device. For example, a defective pixel that may be present in a pixel array is detected by an image processor by using the data inputted from the image sensor. The image processor then records the position information of the defective pixel in a memory and compensates for the defective pixel.

An image sensor generally includes many blocks of a pixel array, an analog read circuit, a timing generator, an ISP, etc., and, by organically connecting these blocks into one body, the image sensor can be made to operate normally.

However, when there is a functional error in one block, each block must be tested to find the cause of the failure in order to normally operate the entire unit. The blocks have various testing schemes such as self-testing functions and the like. Among these testing schemes, the ISP block includes a test pattern generation block that stores a test image data and provides it to the ISP, in which the test image data is utilized to verify the proper functions of the operations executed after the analog-to-digital conversion process.

Various test patterns (e.g., full black, color bar, cross hedge array bar, color ramp, etc.) stored in the ISP, and these various test patterns are utilized for various testing situations (e.g., pixel array failure, analog read circuit failure, timing generator failure, etc.) in which Bayer raw data cannot be inputted to verify each of the functional blocks.

However, the number of the self-test patterns required for a dead pixel compensation (DPC) function is quite large when the DPC function is designed in consideration of a majority of algorithms using a line memory and multi-dead pixels. When the number of test patterns to be provided become so large, it undesirably increases the number of logical computations.

SUMMARY OF THE INVENTION

An aspect of the present invention provides a dead pixel compensating apparatus capable of testing a dead pixel compensation algorithm.

A dead pixel compensating apparatus according to an embodiment of the present invention includes, inter alia: a pattern generation unit generating a programmable test pattern including data with respect to at least one dead pixel; a register array storing the test pattern; a dead pixel compensation unit receiving the test pattern stored in the register array and performing a dead pixel compensation algorithm to output compensation data; and a determination unit comparing the test pattern and the compensation data to determine whether or not the dead pixel compensation algorithm has an error, wherein a dead pixel compensation algorithm for compensating for a dead pixel of an image sensor in image data supplied from the image sensor is tested.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
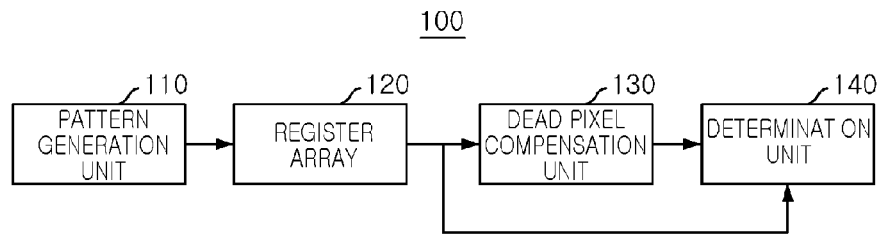
FIG. 1 is a schematic block diagram of a dead pixel compensating apparatus according to an embodiment of the present invention.

Embodiments of the present invention will now be described in detail with reference to the accompanying drawings. The present invention may, however, be embodied in many different forms and should not be construed as being limited to the embodiments set forth herein. In the drawings, the shapes and dimensions of elements may be exaggerated for clarity, and the same reference numerals may be used throughout to designate the same or the like components.

A dead pixel compensating apparatus according to an embodiment of the present invention will now be described with reference to the accompanying drawings.

FIG. 1 is a schematic block diagram of a dead pixel compensating apparatus 100 according to an embodiment of the present invention. As shown in FIG. 1, the dead pixel compensating apparatus 100 tests a dead pixel compensation algorithm for compensating a dead pixel of an image sensor in the image data provided from an image sensor. The dead pixel compensating apparatus 100 includes, inter alia, a pattern generation unit, a register array 120, a dead pixel compensation unit 130, and a determination unit 140. The pattern generation unit 110 generates a programmable test pattern, which includes a data relating to at least one dead pixel. The register array 120 stores the test pattern received from the pattern generation unit 110. A dead pixel compensation unit 130 receives the test pattern stored in the register array 120 and outputs a compensation data after performing a dead pixel compensation algorithm on the received test pattern. A determination unit 140 receives the test pattern from the register array 120 and the compensation data from the dead pixel compensation unit 130 and compares the test pattern and the compensation data to determine whether or not the dead pixel compensation algorithm is defective or faulty.

The dead pixel compensating apparatus 100 having such a configuration operates as follows.

To test a dead pixel compensation algorithm of an image sensor, the dead pixel compensating apparatus 100 may operates in response to a command from a user or other sources.

The pattern generation unit 110 generates a programmable test pattern for testing the dead pixel compensation algorithm. An image sensor includes a pixel array, which includes a plurality of unit pixels. Image data having a plurality of rows and columns is obtained from the pixel array. The image data is obtained by converting an analog signal from the pixel array into digital data through an analog-to-digital converter (ADC) block included in an image processing block of the image sensor. However, when it comes to testing a dead pixel compensation algorithm, operating the pixel array is not required, and as such the ADC block need not operate and no image data need be outputted. Instead, a programmable test pattern, which is generated by the pattern generation unit 110 to replace the image data, is provided to the register array 120.

An image sensor would include a huge size pixel array of 330,000 pixels (640×480) for VGA and 1,300,000 pixels (1280×1024) for SVGA. The amount of image data provided from such a pixel array is very large. Thus, using a test pattern of such a large size data would dramatically increase the number of logical computations.

Thus, the test pattern according to an embodiment of the present invention is configured to have a smaller number of columns and rows in comparison to the image data.

For example, the test pattern may be of a very small size 5×5 data array. By using such a very small sized test pattern for testing a dead pixel compensation algorithm, the number of logical computations can be drastically reduced, and thereby shortening the testing time.

In the test pattern generated by the pattern generation unit 110, a pseudo-dead pixel is implemented in order to virtually represent a dead pixel, and a high illumination value, a low illumination value, and the like, may be variably set as the data corresponding to each pixel.

One or more of pseudo-dead pixels may be provided. Thus, test patterns for testing the dead pixel compensation algorithm with respect to multiple dead pixels, as well as the dead pixel compensation algorithm with respect to one dead pixel, may be generated by the pattern generation unit 110. Such test patterns may be programmable by a user or other sources, and the pattern generation unit 110 may further include an input unit (not shown) allowing programming of the test patterns.

The pattern data generated by the pattern generation unit 110 is stored in the register array 120. The register array 120 includes a plurality of registers, each corresponding to each of the pixels of the test pattern for testing the dead pixel compensation algorithm. The register array 120 may be configured as a line memory.

The dead pixel compensation algorithm is performed in the dead pixel compensation unit 130. In a normal operation, the dead pixel compensation unit 130 would operate while the image sensor is operating to detect a dead pixel from the image data received from the ADC block by way of a line memory and to compensate for the pixel value of the detected dead pixel by using the pixel values of the neighboring pixels. A multiplexer may be further provided (not shown on the drawings) to select any one of the test patterns stored in the register array 120 (or the image data from the image sensor) and provide the selected one of the test patterns (or the image data) to the dead pixel compensation unit 130. The image data from the image sensor would be selected in general and provided to the dead pixel compensation unit 130, but, for testing the dead pixel compensation algorithm, the test pattern stored in the register array 120 would be selected instead and provided to the dead pixel compensation unit 130.

By configuring the register array 120 as a line memory, such as a line memory through which the general image data would pass, the dead pixel compensation unit 130 included in a general image sensor may be advantageously used without changing the design thereof. When the test pattern is inputted, the dead pixel compensation unit 130 compensates for the pixel value of the dead pixel included in the test pattern by performing the dead pixel compensation algorithm installed therein, and outputs the compensation data in which the pixel value with respect to the dead pixel was compensated for in the test pattern to the determination unit 140.

The determination unit 140 receives the test pattern from the register array 120 and the compensation data from the dead pixel compensation unit 130 and compares the received test pattern and the compensation data to determine whether or not the dead pixel compensation algorithm has performed without error.

The determination unit 140 may include, inter alia, an estimation value calculator, a comparator, and a compensation determination unit. The estimation value calculator receives the test pattern and calculates a dead pixel compensation estimation value with respect to the inputted test pattern. The comparator compares the dead pixel compensation estimation value with the compensation data from the dead pixel compensation unit 130. The compensation determination unit that determines whether or not the dead pixel compensation algorithm has performed without an error based on the comparison results from the comparator.

The determination unit 140 may also include a display unit (not shown) to display the test pattern and the compensation data so as to allow user to visually inspect the test pattern and the compensation data shown on the display to determine whether or not the dead pixel compensation algorithm has an error. Whether or not a dead pixel is detected from the compensation data is determined by using an additional dead pixel compensation algorithm, and, when a dead pixel is detected, the dead pixel compensation algorithm may be determined to have an error. When a dead pixel is not detected, the dead pixel compensation algorithm can then be determined to be satisfactory.

In this manner, testing of the dead pixel compensation algorithm is performed on the pattern data of low resolution, instead of being performed on the actual image data outputted from the ADC of the image sensor, which would be of very high resolution. So the dead pixel compensation algorithm can be quickly and effectively tested according to an embodiment of the present invention.

Figure 2A:
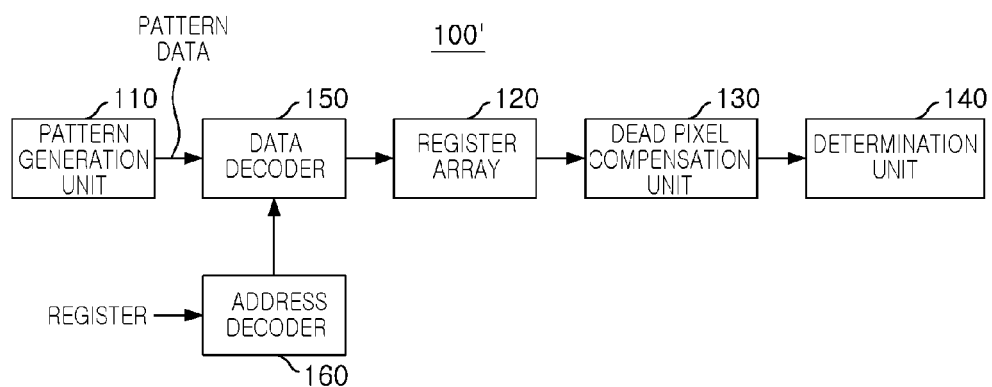
FIG. 2A is a schematic block diagram showing a variation of a dead pixel compensating apparatus according to an embodiment of the present invention.
Figure 2B:
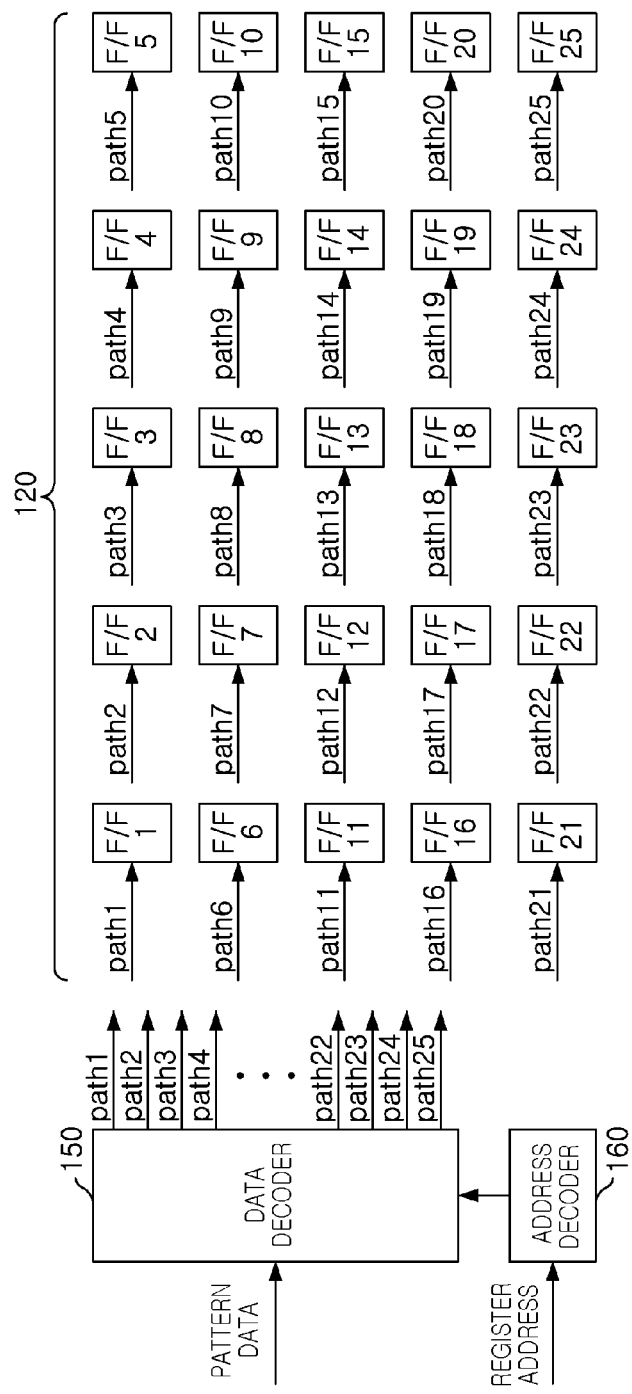
FIG. 2B is a detailed block diagram of an address decoder, a data decoder, and a register array of the dead pixel compensating apparatus according to an embodiment of the present invention.

FIGS. 2A-2B shows a variation of a dead pixel compensating apparatus according to an embodiment of the present invention. FIG. 2A is a schematic block diagram of a dead pixel compensating apparatus 100' according to an embodiment of the present invention, and FIG. 2B is a detailed block diagram of an address decoder 160, a data decoder 150, and a register array 120 of the dead pixel compensating apparatus 100' according to an embodiment of the present invention.

The dead pixel compensating apparatus 100' shown in FIG. 2A and the dead pixel compensating apparatus 100 shown in FIG. 1 are substantially similar, except that FIG. 2A shows an address decoder 160 and a data decoder 150 that are not shown in FIG. 1.

The address decoder 160 receives and decodes an address of a register in the register array 120. The data decoder 150 decodes the pattern data from the pattern generation unit 110 and outputs the decoded test pattern to the register of the register array 120 corresponding to the register address decided by the address decoder 160.

The register array 120 of FIG. 2B is an example of the register array 120 in FIG. 1. The register array 120 in FIG. 2B is shown as an array structure of 5×5, including a total of 25 registers, but it should be readily understood that different sizes of the array structure with different number of registers are also possible according to an embodiment of the present invention. Each register of the register array 120 is configured as a flipflop (F/F) circuit in an embodiment of the present invention.

Referring to FIGS. 2A-2B, in order to store the pattern data in each register of the register array 120, a register address for each of the registers is inputted to the address decoder 160, and the address decoder 160 decodes the input register addresses and transmits the decoded results to the data decoder 150. The data decoder 150 decodes the pattern data and outputs the decoded pattern data to each of the registers of the register array 120 according to the register address decoding results received from the address decoder 160. Through this process, the pattern data is stored in the register array 120.

As described above with reference to FIG. 1, the test pattern stored in the register array 120 is provided to the dead pixel compensation unit 130 and to the determination unit 140, and then the dead pixel compensation unit 130 outputs the compensation data which has been generated by performing the dead pixel compensation algorithm in the dead pixel compensation unit 130 to the determination unit 140. Then, the determination unit 140 compares the test pattern received from the register array 120 and the compensation data received from the dead pixel compensation unit 130 to determine whether or not the dead pixel compensation algorithm has performed without an error.

Figure 3:
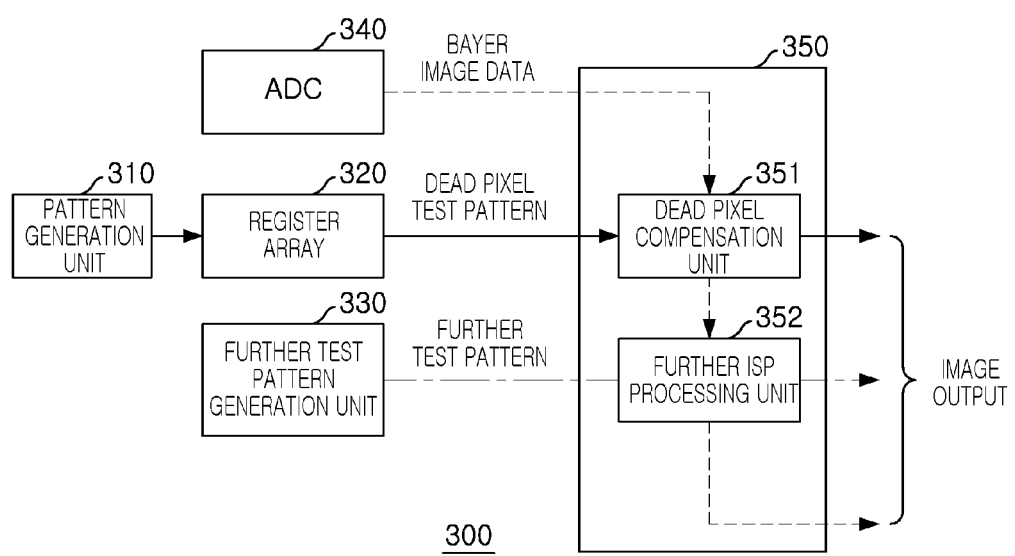
FIG. 3 is a schematic block diagram of an image processing device including the dead pixel compensating apparatus according to an embodiment of the present invention.

Referring to FIG. 3, shown therein is an image processing device 300 including the dead pixel compensating apparatus according to an embodiment of the present invention. The image processing device 300 includes a pattern generation unit 310, a register array 320, a further test pattern generation unit 330, an ADC 340, and an image processing unit 350. The image processing unit 350 includes a dead pixel compensation unit 351, and a further ISP processing unit 352. The pattern generation unit 310, the register array 320, and the dead pixel compensation unit 351 shown in FIG. 3 correspond respectively to the pattern generation unit 110, the register array 120, and the dead pixel compensation unit 130 of the dead pixel compensation testing apparatus 100 shown in FIG. 1. A unit that would correspond to the determination unit 140 in FIG. 1 is not shown in FIG. 3.

The operation of the image processing device 300 will be described briefly. In a normal operating mode, the image processing unit 350 in the image processing device 300 receives the pixel data from a pixel array (not shown) as Bayer image data through the ADC 340. A dead pixel of the input Bayer image data is compensated for by the dead pixel compensation algorithm through the dead pixel compensation unit 351, and then a corresponding image is processed by various image processing algorithms through the further ISP processing unit 352 in order to output the processed image as the final image.

In a test mode, different test patterns according to the test types are inputted to the image processing unit 350 in the imaging processing device 300.

In the case of testing the dead pixel compensation algorithm, a dead pixel test pattern, which has been generated by the pattern generation unit 310 and stored in the register array 320, is inputted to the dead pixel compensation unit 351 of the image processing unit 350. A dead pixel is compensated for by a pixel compensation algorithm in the dead pixel compensation unit 350, and then the compensated data is outputted.

In the case of performing a test other than the testing of the dead pixel compensation algorithm, a further test pattern is generated by the further test pattern generation unit 330, and the further test pattern is inputted to the further ISP processing unit 352 of the image processing unit 350. The further test pattern is then processed by various image processing algorithms in the further ISP processing unit 352, and then an image data is outputted.

By operating the dead pixel compensating apparatus in an image processing device in the manner according to an embodiment of the present invention as described above, testing of the dead pixel compensation algorithm is performed on the low resolution pattern data as opposed to the high resolution image data outputted from the ADC of the image sensor. Thus, in contrast to the conventional testing techniques, the dead pixel compensation algorithm can be quickly and effectively tested according to an embodiment of the present invention.

In addition, because the test pattern is programmable by a user and other sources, various test patterns can be generated to test the dead pixel compensation algorithm, thereby significantly enhancing the quality of a generated image.

As set forth above, according to embodiments of the invention, since the dead pixel compensation algorithm is tested by performing the dead pixel compensation algorithm on the pattern data of low resolution as opposed to actual image data outputted from the ADC of the image sensor. Because it is not necessary to perform a testing on the high resolution actual image data, the dead pixel compensation algorithm can be more quickly and effectively tested.

In addition, since the test pattern can be programmed by a user or other sources, various test patterns can be generated to test the dead pixel compensation algorithm, and this results in a significant enhancement of the generated image quality.

While the present invention has been shown and described in connection with the embodiments, it will be apparent to those skilled in the art that modifications and variations can be made without departing from the spirit and scope of the invention as defined by the appended claims.

What is claimed is:

1. A dead pixel compensating apparatus comprising:
a pattern generation unit generating a programmable test pattern having data related to one or more dead pixels;
a dead pixel compensation unit performing a dead pixel compensation algorithm on the test pattern to output a compensation data; and
a determination unit comparing the test pattern and the compensation data to determine whether or not the dead pixel compensation algorithm has an error, and
a register array storing the test pattern received from the pattern generation unit and providing the received test pattern to the dead pixel compensation unit,
wherein the determination unit comprises:
an estimation value calculator calculating a dead pixel compensation estimation value with respect to the test pattern;

a comparator comparing the dead pixel compensation estimation value with the compensation data from the dead pixel compensation unit; and a compensation determination unit determining whether or not the dead pixel compensation algorithm has an error based on comparison results from the comparator.

2. The apparatus of claim 1, further comprising:

an address decoder receiving an address of a register of the register array and decoding the received address; and a data decoder decoding the pattern data and outputting the decoded test pattern to the register of the register array corresponding to the address decoded by the address decoder.

3. The apparatus of claim 1, wherein the register array comprises a line memory.

4. The apparatus of claim 1, wherein each register of comprises a flipflop circuit.

5. The apparatus of claim 1, wherein the determination unit comprises a display unit displaying the test pattern and the compensation data.

6. The apparatus of claim 1, wherein the determination unit comprises:

an estimation value calculator calculating a dead pixel compensation estimation value with respect to the test pattern;

a comparator comparing the dead pixel compensation estimation value with the compensation data from the dead pixel compensation unit; and a compensation determination unit determining whether or not the dead pixel compensation algorithm has an error based on comparison results from the comparator.

7. An image processing device comprising:

an analog to digital converter outputting an image data;

a dead pixel test pattern generation unit outputting a test pattern, wherein the test pattern is of a lower resolution that the image data; and an image processing unit comprising a dead pixel compensation unit, wherein in a normal mode, the dead pixel compensation unit performs dead pixel compensation operations on the image data, and wherein in a test mode, the dead pixel compensation unit performs dead pixel compensation operation on the test pattern.

8. The image processing device of claim 7, wherein the dead pixel test pattern generation unit comprises:

a pattern generation unit generating a programmable test pattern having data related to one or more dead pixels; and a register array storing the test pattern received from the pattern generation unit and providing the received test pattern to the dead pixel compensation unit.

9. The image processing device of claim 8, further comprising:

an address decoder receiving an address of a corresponding register of the register array and decoding the received address; and a data decoder decoding the pattern data and outputting the decoded test pattern to the register of the register array corresponding to the address decoded by the address decoder.

10. The image processing device of claim 8, wherein the register array is configured as a line memory.

11. The image processing device of claim 8, wherein each of the registers of the register array is a flipflop circuit.

12. The image processing device of claim 8, wherein the image processing unit comprises:

a dead pixel compensation unit performing a dead pixel compensation algorithm on the test pattern to output a compensation data.

13. The image processing device of claim 12, further comprising:

a determination unit comparing the test pattern and the compensation data to determine whether or not the dead pixel compensation algorithm has an error.

14. The image processing device of claim 13, wherein the determination unit comprises:

an estimation value calculator calculating a dead pixel compensation estimation value with respect to the test pattern;

a comparator comparing the dead pixel compensation estimation value with the compensation data from the dead pixel compensation unit; and a compensation determination unit determining whether or not the dead pixel compensation algorithm has an error based on comparison results from the comparator.

15. The image processing device of claim 13, wherein the determination unit comprises a display unit displaying the test pattern and the compensation data.

16. The image processing device of claim 12, wherein the image processing unit further comprises a further Image Signal Processor (ISP) processing unit, and wherein, in the normal mode, a dead pixel in the image data is compensated for by the dead pixel compensation algorithm through the dead pixel compensation unit and then the processed image data is further processed by image processing algorithms through the further ISP processing unit.

17. The image processing device of claim 16, wherein the dead pixel test pattern generation unit further comprises a further test pattern generation unit generating a further test pattern for performing a non-dead pixel related test.

18. The image processing device of claim 17, wherein, in the test mode, the further test pattern is inputted to the further ISP processing unit of the image processing unit, and then the further test pattern is processed by image processing algorithms in the further ISP processing unit.

* * * * *